No. 665,018. Patented Jan. 1, 1901.
E. S. LEAYCRAFT.
BICYCLE CHAIN ADJUSTMENT.
(Application filed Oct. 5, 1897.)
(No Model.)
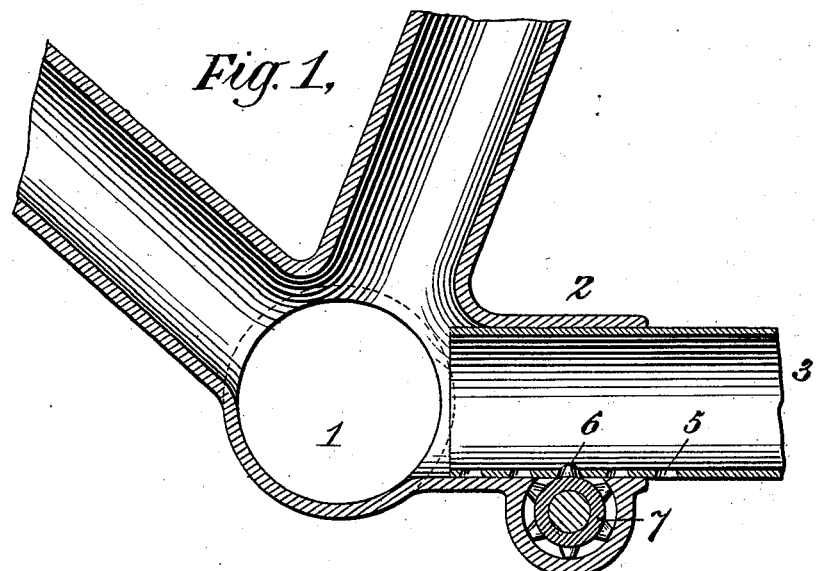
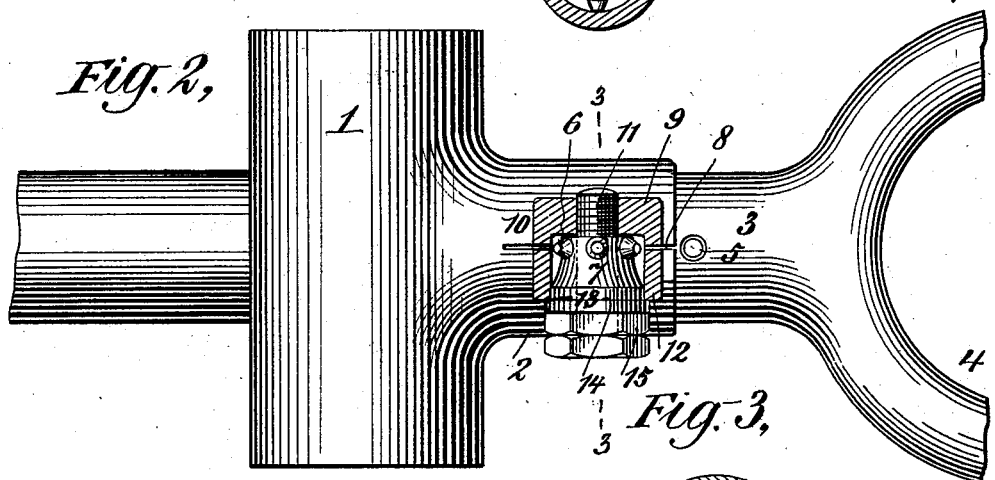
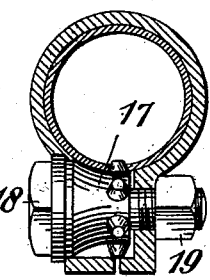
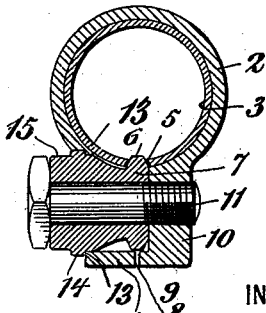
WITNESSES:
O. N. Hayward
Seabury C. Mastick
INVENTOR
Edwin S. Leaycraft
BY
Ernest Hopkinson
his ATTORNEY
THE NORRIS PETERS CO., PHOTO-LITHO., WASHINGTON, D. C.

UNITED STATES PATENT OFFICE.

EDWIN S. LEAYCRAFT, OF JERSEY CITY, NEW JERSEY.

BICYCLE-CHAIN ADJUSTMENT.

SPECIFICATION forming part of Letters Patent No. 665,018, dated January 1, 1901.

Application filed October 5, 1897. Serial No. 654,103. (No model.)

*To all whom it may concern:*

Be it known that I, EDWIN S. LEAYCRAFT, of Jersey City, in the county of Hudson and State of New Jersey, have invented certain new and useful Improvements in Bicycle-Chain Adjustment, of which the following is a specification.

The present invention relates to bicycle adjustment, and has for its object to provide a means of adjusting the relative distance between the crank-axle bearing and the axle of the rear wheel, so as to tighten or slacken the driving sprocket-chain, and particularly its object is to provide such a mechanism which will adjust the devices along the central line, thus obviating the necessity of separate adjustment for each side of the rear wheel of a bicycle.

In the drawings I have shown a construction embodying my invention, in which—

Figure 1 is a vertical longitudinal section of part of the bicycle. Fig. 2 is an inverted plan view of a portion of a bicycle-frame. Fig. 3 is a detail view, partly in section along the line 3 3 of Fig. 2; and Fig. 4 is a view similar to Fig. 3, showing a modified form.

Like figures of reference refer to like parts throughout the several views of the drawings.

Referring to the drawings in detail, 1 represents the hub of the crank-axle, and 2 is a tube projecting therefrom toward the rear wheel. In this tube telescopes a tube 3, which branches off into the side bars 4. The tube 3 on its lower surface is provided with openings 5, into which are adapted to project or engage the teeth 6, formed on a sprocket-piece 7. The lower side of the tube 2 is provided with a longitudinal slit 8 and a housing 9, one part of which, 10, is made with a substantial thickened portion to afford an extended threaded surface to receive the threaded bolt 11, upon which the sprocket-piece 7 rotates, the other portion of said housing 12 being cut out, so as to receive the toothed wheel or sprocket-piece 7. This portion 12 of the housing and the tube is provided with a shoulder 13, against which abuts the annular shoulder 14.

15 designates the bolt-head portion of the sprocket-piece 7, whereby the same is turned by a suitable key.

It will be noted that the diameter of the sprocket-piece 7 through the sprocket-teeth is less than the diameter of the entering-opening in the portion of the housing 12, so that in assembling the parts the bolt 11, carrying the sprocket-piece, is passed through the opening in the housing 12 and threaded into the opposite portion of the housing 10. The tube 3 is then inserted into the tube 2 and the desired adjustment secured by operating the sprocket-piece 7. When the tube 3 is in the desired position, which of course imports that the rear wheel, which is journaled between the branches 4, is in proper relationship as to distance with the crank-axle bearing, the tube 2 is clamped around the tube 3 by screwing the bolt 11. It will be noted that in this construction the adjustment of the rear wheel is obtained by simply unscrewing the bolt 11, so as to release the clamping action of the tube 2 upon the tube 3, and then turning the sprocket-piece 7 by the same key, the bolt-head portion 15 of the sprocket-piece 7 being made of the same size as the head of bolt 11 for this purpose. It will thus be seen that the whole operation of adjusting the wheel may be effected upon one side of the wheel without the necessity of having to alternately adjust first one side and then the other.

In Fig. 4 is shown a modified construction in which the sprocket-piece 17 is made integral with the bolt 18 and the clamping action is secured by a nut 19 upon the opposite side of the housing.

It will be noted that the bolt 11, threaded into the thickened portion of the housing in the construction illustrated in Figs. 1, 2, and 3, and the threaded portion of bolt 18 and nut 19, Fig. 4, constitute clamping-screws for securing the two frame members together.

What is claimed as new is—

In a bicycle or similar vehicle, the combination of a crank-axle bearing, a single rear frame member extending therefrom, a single frame member extending from the side bars of the vehicle-frame, said members telescoping one within the other, a housing on one of said members provided with an opening of greater diameter than the toothed wheel supported in said housing, a toothed wheel supported and inclosed in said housing and engaging the other member, facets formed on said toothed wheel for turning the same, a shoulder also formed on said toothed wheel and impinging against the sides of the opening formed in the housing, and a clamping-screw passing through the housing for securing the two frame members in position relatively to each other, substantially as specified.

In testimony whereof I have signed my name to this specification in the presence of two subscribing witnesses.

EDWIN S. LEAYCRAFT.

Witnesses:
ERNEST HOPKINSON,
W. LAIRD GOLDSBOROUGH.